Aug. 29, 1933.     V. BENDIX ET AL     1,924,592
BRAKE
Filed Dec. 15, 1927

INVENTOR
ADIEL Y DODGE
VINCENT BENDIX
BY
ATTORNEY

Patented Aug. 29, 1933

1,924,592

UNITED STATES PATENT OFFICE 1,924,592

BRAKE

Vincent Bendix, Chicago, Ill., and Adiel Y. Dodge, South Bend, Ind., assignors to Bendix Brake Company, South Bend, Ind., a corporation of Illinois Application December 15, 1927
Serial No. 240,243

4 Claims. (Cl. 188—78)

This invention relates to brakes, and is illustrated as embodied in an internal expanding brake for an automobile. An object of the invention is to provide a simple and inexpensive brake which is yet extremely powerful in its action.

One feature of the invention relates to arranging a servo shoe to overlap the ends of the friction means of the brake, preferably by providing the servo shoe with spaced stiffening webs straddling those ends.

In one desirable arrangement, the servo-shoe is in direct thrust engagement with the ends of the friction means, for example having its two webs engaging thrust pins extending crosswise of said ends. We prefer that the friction means should be of the type anchoring on one of said ends when the drum is turning in one direction and on the other of said ends when the drum is turning in the other direction.

Other features of novelty relate to the shoe construction, and to other novel and desirable structural features which will be apparent from the following description of the illustrative embodiment shown in the accompanying drawing, in which.

Figure 1:
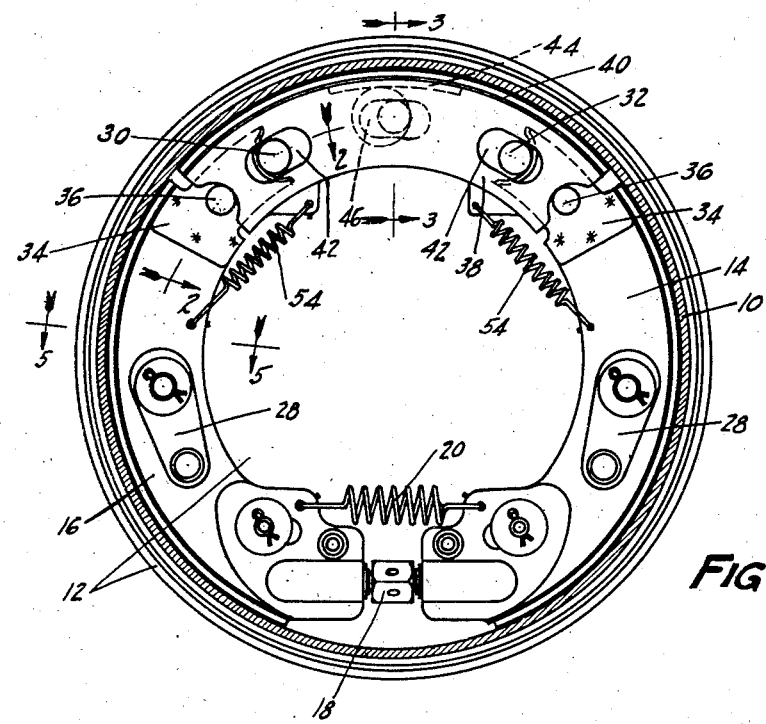
Figure 1 is a vertical section through the brake, just inside the head of the brake drum, and showing the novel brake shoes inside elevation.

The illustrated brake includes a rotatable drum 10, at the open side of which is a stationary support such as a backing plate 12, and within which is arranged the friction means of the brake.

We prefer that the friction means should comprise a device which is shiftable to anchor at one end when the drum is turning in one direction and at the other end when the drum is turning in the other direction, and shown as including two brake shoes 14 and 16 connected by a floating expansible joint 18, against which the shoes are held by a tension spring 20.

Figure 5:
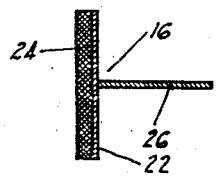
Figure 5 is a section through one of the brake shoes, on the line 5—5 of Figure 1.
Figure 2:
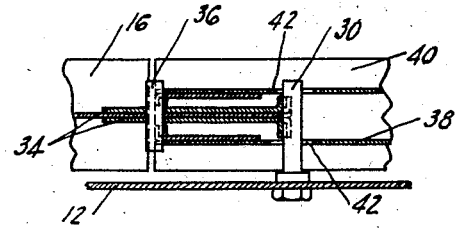
Figure 2 is a partial section through one of the anchorages, on the line 2—2 of Figure 1.
Figure 4:
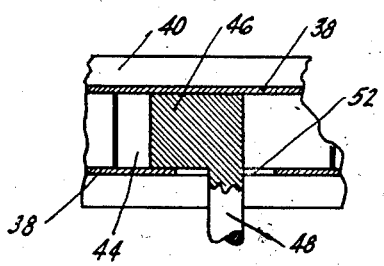
Figure 4 is a partial horizontal section through the applying means, on the line 4—4 of Figure 3.
Figure 3:
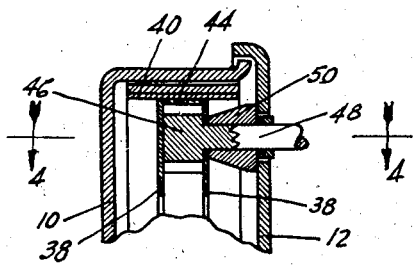
Figure 3 is a partial radial section through the applying means on the line 3—3 of Figure 1.

As shown in Figure 5, each shoe may be built up by welding together a rim 22, to which the lining 24 is afterwards secured, and a separately-formed stiffening web 26. Suitable stops 28, of any desired sort, determine the positions of the shoes when the brake is released.

The anchoring means in this case includes two posts or abutments 30 and 32 carried by the backing plate, the end of shoe 16 anchoring on post 30 when the drum is turning clockwise and the end of shoe 14 anchoring on post 32 when the drum is turning counter-clockwise.

The ends of the shoes are preferably reinforced by plates 34 spot-welded or otherwise secured to their sides, and which may be flanged laterally at their ends to extend the surfaces bearing against posts 30 and 32. We prefer to press novel thrust pins 36 crosswise of the shoes through the triple-thickness reinforced end portions.

These pins are so arranged as to seat in sockets cut in the ends of spaced stiffening webs 38 of an improved servo-shoe 40, the webs having relatively large openings 42 for the anchors 30, and if desired being in the form of steel stampings welded to the rim of the shoe.

Between the webs 38, there is secured to the inner face of the rim of shoe a wear plate 44, for engagement with an applying device such as a cam 46 on a camshaft 48 journaled in a support 50 carried by the backing plate 12. Shaft 48 passes through a relatively large opening 52 in one web of shoe 40, so that it does not interfere with lengthwise movement of the shoe.

When shoe 40 is forced against the drum, against the resistance of return springs 54 connecting it to the shoes 14 and 16, it turns in the same direction as the drum, in engagement with one of the pins 36, to apply the friction device comprising the shoes 14 and 16. It will be noticed that the webs of shoe 40 straddle the ends of the friction device 14—16, in such a manner that the servo shoe overlaps the friction device, thus giving as much lining as possible in engagement with the drum.

While one illustrative embodiment has been described in detail, it is not our intention to limit its scope to that particular embodiment, or otherwise than by the terms of the appended claims.

We claim:

1. A brake comprising, in combination, a shoe having spaced webs, at least one of which is formed with a relatively-large opening, and a shaft passing through said opening and provided with an applying device between said webs in engagement with the shoe.

2. A brake comprising a shoe having spaced webs notched at their ends and one of which is formed with an opening for the insertion of an applying device.

3. A brake comprising a shoe having spaced webs notched at their ends and one of which is formed with an opening for the insertion of an applying device and formed with anchor-clearance openings on opposite sides of the applying-device opening.

4. A brake comprising a shoe having spaced webs notched at their ends and one of which is formed with an opening for the insertion of an applying device and having a centrally-arranged wear plate opposite said opening.

VINCENT BENDIX.
ADIEL Y. DODGE.